(12) United States Patent
Fukawatase et al.

(10) Patent No.: US 9,421,935 B2
(45) Date of Patent: Aug. 23, 2016

(54) VEHICLE AIRBAG DEVICE

(71) Applicant: Toyota Jidosha Kabushiki Kaisha, Toyota-shi Aichi-ken (JP)

(72) Inventors: Osamu Fukawatase, Miyoshi (JP); Shinichi Ishida, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/743,290

(22) Filed: Jun. 18, 2015

(65) Prior Publication Data

US 2015/0367802 A1     Dec. 24, 2015

(30) Foreign Application Priority Data

Jun. 23, 2014 (JP) ................ 2014-128433

(51) Int. Cl.
*B60R 21/205* (2011.01)
*B60R 21/231* (2011.01)

(52) U.S. Cl.
CPC .... *B60R 21/205* (2013.01); *B60R 2021/23107* (2013.01); *B60R 2021/23161* (2013.01)

(58) Field of Classification Search
CPC .......... B60R 21/205; B60R 21/23138; B60R 2021/23161; B60R 2021/23107
See application file for complete search history.

(56) References Cited

U.S. PATENT DOCUMENTS

| 5,306,043 | A * | 4/1994 | Mihm | B60R 21/233 |
| | | | | 280/732 |
| 6,164,696 | A * | 12/2000 | Ellerbrok | B60R 21/2342 |
| | | | | 280/729 |
| 7,350,807 | B2 * | 4/2008 | Schneider | B60R 21/233 |
| | | | | 280/732 |
| 7,597,347 | B2 * | 10/2009 | Hasebe | B60R 21/231 |
| | | | | 280/729 |
| 7,607,683 | B2 * | 10/2009 | Fischer | B60R 21/231 |
| | | | | 280/730.1 |
| 7,695,012 | B2 * | 4/2010 | Libby | B60R 21/233 |
| | | | | 280/729 |
| 8,308,187 | B2 * | 11/2012 | Miyata | B60R 21/233 |
| | | | | 280/729 |
| 8,662,527 | B2 * | 3/2014 | Sato | B60R 21/205 |
| | | | | 280/729 |
| 2002/0063416 | A1 | 5/2002 | Kamaiji et al. | |
| 2003/0116945 | A1 * | 6/2003 | Abe | B60R 21/231 |
| | | | | 280/729 |
| 2005/0098994 | A1 * | 5/2005 | Matsumura | B60R 21/231 |
| | | | | 280/743.1 |
| 2007/0108753 | A1 * | 5/2007 | Pang | B60R 21/231 |
| | | | | 280/743.2 |
| 2009/0121462 | A1 * | 5/2009 | Rick | B60R 21/206 |
| | | | | 280/729 |
| 2012/0261910 | A1 * | 10/2012 | Fischer | B60R 21/205 |
| | | | | 280/732 |
| 2015/0166002 | A1 * | 6/2015 | Fukawatase | B60R 21/233 |
| | | | | 280/730.1 |
| 2015/0258958 | A1 * | 9/2015 | Belwafa | B60R 21/233 |
| | | | | 280/729 |
| 2015/0307056 | A1 * | 10/2015 | Cheng | B60R 21/205 |
| | | | | 280/729 |
| 2015/0343986 | A1 * | 12/2015 | Schneider | B60R 21/205 |
| | | | | 280/729 |

FOREIGN PATENT DOCUMENTS

| JP | H06-24282 A | 2/1994 |
| JP | H06-72276 A | 3/1994 |
| JP | 2002-160600 A | 6/2002 |
| JP | 2012-056371 A | 3/2012 |

* cited by examiner

*Primary Examiner* — Darlene P Condra
(74) *Attorney, Agent, or Firm* — Dinsmore & Shohl LLP

(57) ABSTRACT

A vehicle airbag device included: an airbag that is disposed at an inner side of an instrument panel, that receives a supply of gas from an inflator and inflates and deploys to an outer side of the instrument panel, and that comprises a first bag that inflates and deploys at a vehicle front side of an occupant, and a second bag that inflates and deploys at a vehicle width direction center side of the first bag; and a recess that is formed at a lower face of the second bag when inflated and deployed, that is open toward a vehicle lower side, and that covers an interior component installed at a vehicle width direction central portion of the instrument panel from a vehicle upper side.

9 Claims, 5 Drawing Sheets

VEHICLE AIRBAG DEVICE

CROSS-REFERENCE TO RELATED APPLICATION

This application is based on and claims priority under 35 USC 119 from Japanese Patent Application No. 2014-128433 filed on Jun. 23, 2014, the disclosure of which is incorporated by reference herein.

BACKGROUND

1. Technical Field

The present invention relates to a vehicle airbag device.

2. Related Art

In a vehicle airbag device described in Japanese Patent Application Laid-Open (JP-A) No. 2012-056371, an airbag includes a pair of inflating portions, and a pair of extension portions extending from locations of the pair of inflating portions at heights corresponding to the head or shoulders of an occupant toward the vehicle rear side. This thereby enables the occupant of a front passenger seat moving obliquely toward the front side to be restrained during an oblique collision of a vehicle. There are also vehicle airbag devices that are described in, for example, JP-A Nos. H06-072276, H06-024282, and 2002-160600.

Consideration may be given to providing an airbag with a second bag, disposed on a vehicle width direction center side of the occupant, in order to improve restraint performance with respect to movement of the occupant obliquely toward the front side during an oblique collision of the vehicle.

However, when, for example, an interior component such as a display is installed at a vehicle width direction central portion of an instrument panel, there is a possibility of the interior component obstructing inflation and deployment of a second bag, such that the inflation and deployment characteristics of the second bag suffer. When this occurs, there is also a concern of breakage of the interior component. In a case in which a leading end portion of the second bag is configured in a shape to avoid the interior component, support from the second bag with respect to load from the vehicle rear side becomes insufficient, and a sufficient reaction force may not act on the occupant from the second bag in an oblique collision of the vehicle. The restraint performance of the occupant decreases as a result.

SUMMARY

In consideration of the above circumstances, the present disclosure provides a vehicle airbag device capable of improving restraint performance of an occupant, while suppressing or preventing an interior component from obstructing inflation and deployment of a second bag disposed on a vehicle width direction center side.

One aspect of the present disclosure is a vehicle airbag device including: an airbag that is disposed at an inner side (rear side) of an instrument panel, that receives a supply of gas from an inflator and inflates and deploys to an outer side (front side) of the instrument panel, and that comprises a first bag that inflates and deploys at a vehicle front side of an occupant, and a second bag that inflates and deploys at a vehicle width direction center side of the first bag; and a recess that is formed at a lower face of the second bag when inflated and deployed, that is open toward a vehicle lower side, and that covers an interior component installed at a vehicle width direction central portion of the instrument panel from a vehicle upper side.

In the vehicle airbag device of the present aspect, the airbag is provided at the back side of the instrument panel, and the airbag receives a supply of gas from the inflator and inflates and deploys toward the front side of the instrument panel. Specifically, the first bag of the airbag inflates and deploys at the vehicle front side of an occupant, and the second bag of the airbag inflates and deploys at the vehicle width direction center side of the first bag. The occupant attempting to move obliquely toward the front and the vehicle width direction center side during an oblique collision of the vehicle is accordingly restrained by the second bag. This thereby enables restraint performance of the occupant to be improved.

Note that the recess open toward the vehicle lower side is formed at the lower face of the second bag when inflated and deployed, and the recess covers the interior component installed at the vehicle width direction central portion of the instrument panel from the vehicle upper side. Namely, the airbag inflates and deploys such that the recess of the second bag covers the interior component from the vehicle upper side. This thereby enables the interior component to be suppressed or prevented from obstructing inflation and deployment of the second bag. The second bag may also be configured so as to enfold the interior component in the vehicle front-rear direction following inflation and deployment of the second bag. This thereby enables a front end portion of the second bag to be supported by the interior component, and enables a reaction force from the second bag to be act on the occupant during an oblique collision of the vehicle.

Due to the above, the vehicle airbag device of the present aspect is capable of improving restraint performance of an occupant, while suppressing or preventing an interior component from obstructing inflation and deployment of a second bag disposed on a vehicle width direction center side.

BRIEF DESCRIPTION OF THE DRAWINGS

Exemplary embodiments of the present invention will be described in detail based on the following figures, wherein.

DETAILED DESCRIPTION

Explanation follows regarding a vehicle airbag device 30 according to an exemplary embodiment, with reference to the drawings. Note that in each of the drawings, the arrow FR, the arrow UP, and the arrow LH respectively indicate the front side, the upper side, and the left side, this being one side in the vehicle width direction, of a vehicle V applied with the vehicle airbag device 30. Unless specifically indicated, reference hereafter simply to the front and rear, up and down, and left and right directions indicates the front and rear in the vehicle front-rear direction, up and down in the vehicle up-down direction, and the left and right of the vehicle (when facing forward).

Outline Configuration of Vehicle V Interior

Figure 1:
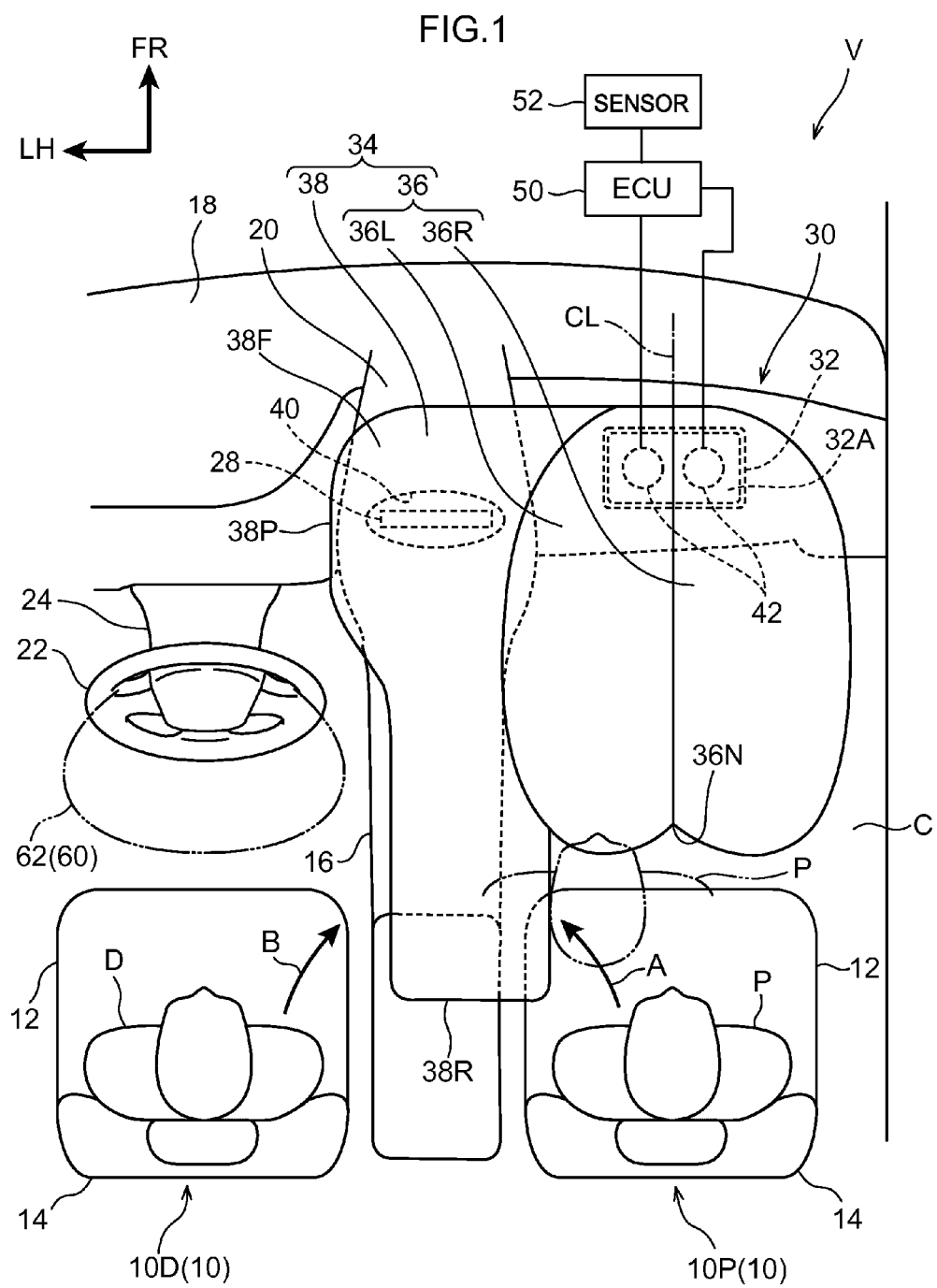
FIG. 1 is a plan view illustrating a vehicle cabin applied with a vehicle airbag device according to an exemplary embodiment, illustrating a state in which airbags have been inflated and deployed.

FIG. 1 is a schematic plan view illustrating part of the vehicle V applied with the vehicle airbag device 30, including a front section of a cabin C interior. Note that in FIG. 1, an airbag 34 of the vehicle airbag device 30, described later, is illustrated in an inflated and deployed state. As illustrated in FIG. 1, a pair of left and right vehicle seats 10 is disposed inside the cabin C, in a row along the vehicle width direction. Each vehicle seat 10 includes a seat cushion 12 functioning as a seating section, and a seatback 14 functioning as a backrest section. A lower end portion of the seatback 14 is coupled to a rear end portion of the seat cushion 12.

In the present exemplary embodiment, the vehicle seat 10 disposed at the left side is a driving seat 10D, and the vehicle seat 10 disposed at the right side is a passenger seat 10P. A center console 16 is disposed between the driving seat 10D and the passenger seat 10P. Namely, in the vehicle V of the present exemplary embodiment, there is no center seat disposed between the driving seat 10D and the passenger seat 10P. Note that the vehicle V may be configured without the center console 16 (for example, a configuration providing a passageway between the left and right vehicle seats 10).

Figure 2:
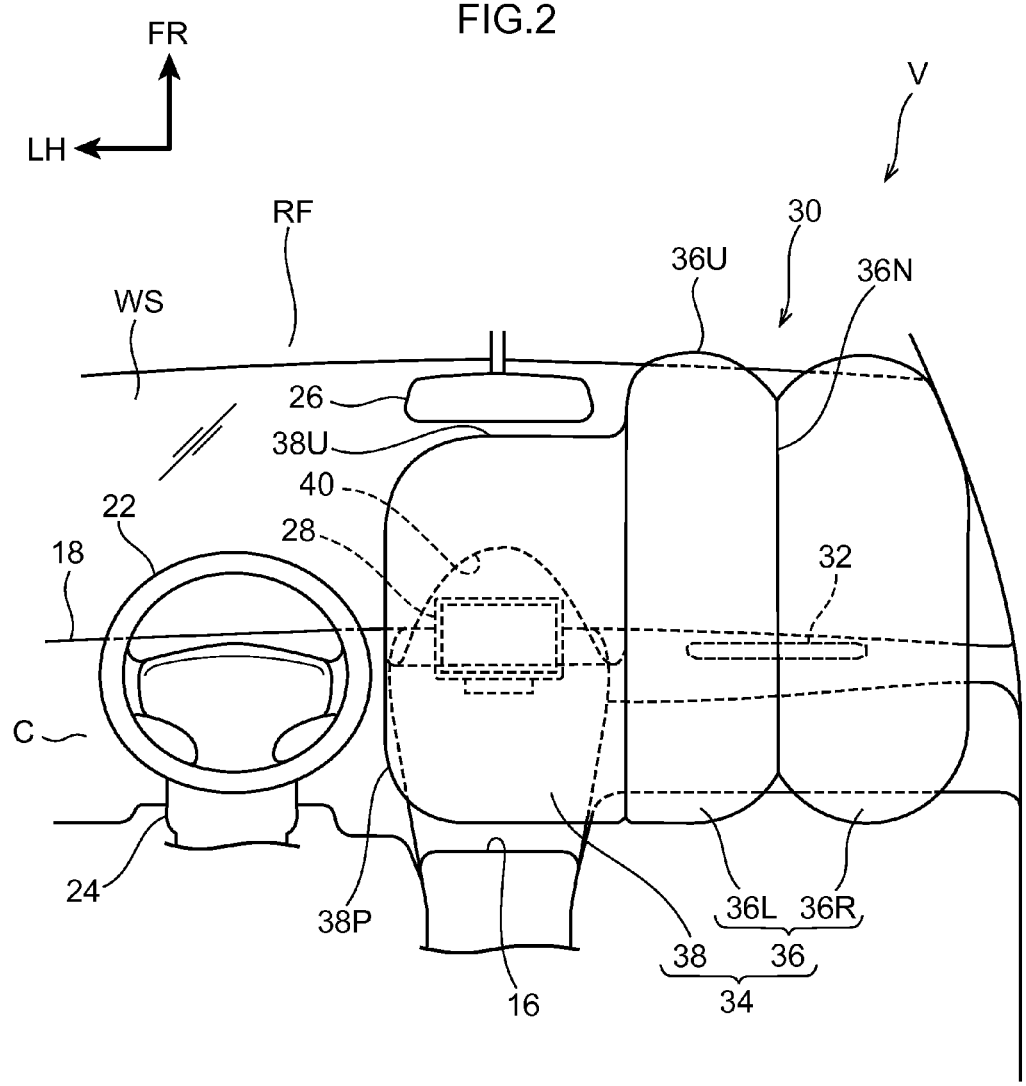
FIG. 2 is a back view of the vehicle cabin illustrated in FIG. 1, as viewed from the vehicle rear side.

As also illustrated in FIG. 2, an instrument panel 18 extending in the vehicle width direction is disposed at the front side of the driving seat 10D and the passenger seat 10P, and a center panel 20 (see FIG. 1) is disposed at a vehicle width direction central portion of the instrument panel 18. A front end of the center console 16 mentioned above is connected to a vehicle width direction central portion of the instrument panel 18. A steering wheel 22 is disposed at a portion of the instrument panel 18 on the driving seat 10D side in the vehicle width direction. The steering wheel 22 is supported by a steering column 24, and is disposed to the rear side of the instrument panel 18 (on the side of the driving seat 10D).

Respective seatbelt devices (not illustrated in the drawings) are provided to the driving seat 10D and the passenger seat 10P for occupant restraint. The seatbelt devices are what are known as three point seatbelt devices. The waists of an occupant D (referred to hereafter as the driver D) in the driving seat 10D and an occupant P (referred to hereafter as the passenger P) of the passenger seat 10P are restrained by lap belts, and the upper bodies of the driver D and the passenger P are restrained by shoulder belts.

Figure 3:
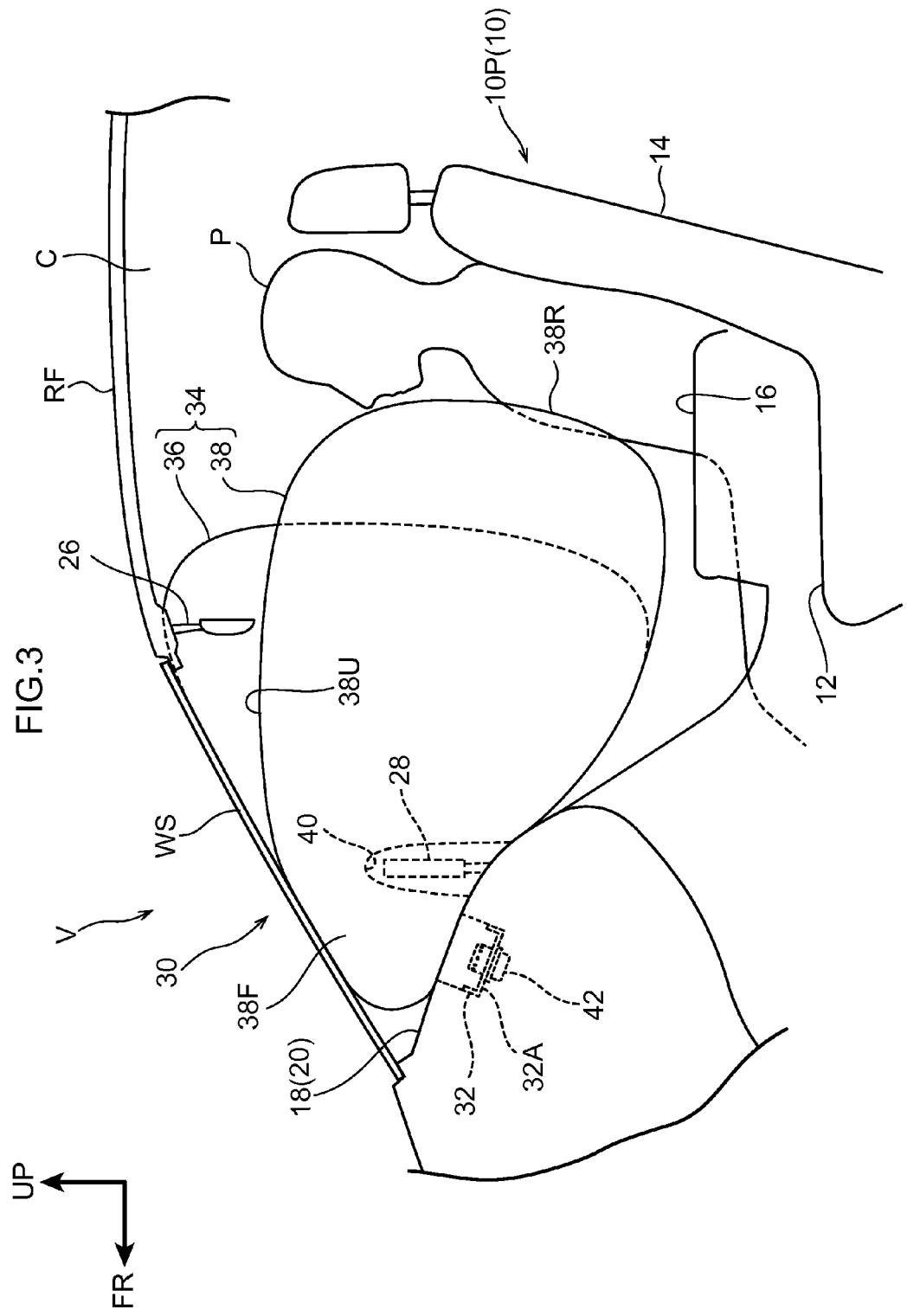
FIG. 3 is a side view of the vehicle cabin illustrated in FIG. 1, as viewed from the side of a driving seat.

As illustrated in FIG. 2 and FIG. 3, a rear-view mirror 26 is provided in front of and above the vehicle seats 10 in the cabin C. The rear-view mirror 26 is installed at a vehicle width direction central portion of an upper portion of a windshield WS, or at a front end of a roof RF. Moreover, as illustrated in FIG. 1 to FIG. 3, a display 28 (display device), serving as an "interior component", is installed to the center panel 20. The display 28 is formed in a flattened substantially rectangular shape, projects out from the center panel 20 toward the upper side, and is disposed with a display screen at the rear side.

Vehicle Airbag Device 30

As illustrated in FIG. 1, the vehicle airbag device 30 includes a substantially rectangular box shaped module case 32 that is open toward the upper side (an element corresponding to a "case" in the broad definition), the airbag 34 that is housed in a folded state inside the module case 32, and a pair of left and right inflators 42 (gas generation devices) that eject and supply gas to the airbag 34. The vehicle airbag device 30 is disposed within (behind) the instrument panel 18 at the front side of the passenger seat 10P, and a vehicle width direction center line CL of the vehicle airbag device 30 (the module case 32) is set at a position substantially aligned with a seat width direction center line (not illustrated in the drawings) of the passenger seat 10P. The vehicle airbag device 30 is supported by instrument panel reinforcement (not illustrated in the drawings) or the like extending in the vehicle width direction inside the instrument panel 18. An airbag door is formed in the instrument panel 18 at a location covering the module case 32.

Airbag 34

As illustrated in FIG. 2, the airbag 34 is, for example, configured in a bag shape by stitching together outer peripheral portions of plural base cloths. The airbag 34 includes a passenger seat airbag 36, serving as a "first bag", that inflates at the front side of the passenger P, and a center airbag 38, serving as a "second bag", that is in communication with the passenger seat airbag 36 and that inflates along the front-rear direction on the vehicle width direction center side adjacent to the passenger seat airbag 36, in the inflated and deployed state of the airbag 34.

The passenger seat airbag 36 includes a left bag section 36L and a right bag section 36R, and inflates and deploys to form a substantially left-right symmetrical shape in plan view. A boundary line between the left bag section 36L and the right bag section 36R (namely, a vehicle width direction center line of the passenger seat airbag 36) is substantially aligned with the vehicle width direction center line CL of the vehicle airbag device 30. In the inflated and deployed state of the passenger seat airbag 36, a rear end of the left bag section 36L is positioned at the front side of the left shoulder of the passenger P, and a rear end of the right bag section 36R is positioned at the front side of the right shoulder of the passenger P. Further, a nook 36N, formed between the rear ends of the left bag section 36L and the right bag section 36R, is positioned at the front side of the head of the passenger P in the inflated and deployed state of the passenger seat airbag 36.

As described above, the center airbag 38 inflates and deploys along the front-rear direction on the vehicle width direction center side, adjacent to the passenger seat airbag 36. More specifically, the center airbag 38 is offset toward the vehicle width direction center side with respect to the pair of left and right inflators 42, described later, and inflates and deploys at the upper side of the center console 16. The airbag 34 accordingly inflates and deploys expanding toward the vehicle width direction center side, so as to give a left-right asymmetrical shape in plan view.

In the inflated and deployed state of the center airbag 38, a front end portion 38F of the center airbag 38 is disposed between the center panel 20 of the instrument panel 18 and the windshield WS (see FIG. 3). A rear end 38R of the center airbag 38 is positioned further to the rear side than a rear end of the passenger seat airbag 36 in the front-rear direction. Namely, a rear end portion of the center airbag 38 projects out to the rear side than the passenger seat airbag 36 in plan view, so as to be positioned obliquely to the left at the front side of the passenger P. The front-rear direction length of the center airbag 38 is thus set longer than the front-rear direction length of the passenger seat airbag 36.

As illustrated in FIG. 1, the front end portion 38F of the center airbag 38 is formed with a protruding portion 38P that protrudes toward the driving seat 10D side. Moreover, as illustrated in FIG. 3, an upper end 38U of the center airbag 38 is set lower than an upper end 36U of the passenger seat airbag 36. Specifically, the center airbag 38 is configured so as not to impinge on the rear-view mirror 26.

As illustrated in FIG. 1 to FIG. 3, a lower face of the front end portion 38F of the center airbag 38 is formed with a recess 40. The recess 40 forms a pocket shape opening toward the lower side, and is formed in a substantially elliptical cone shape. The recess 40 is formed at a position corresponding to the display 28 installed to the center panel 20, and covers the display 28 from the upper side. Namely, the center airbag 38 is configured to inflate and deploy so that the recess 40 covers the display 28 from the upper side during inflation and deployment of the center airbag 38. Following inflation and deployment of the center airbag 38, the display 28 is enfolded by the center airbag 38 in the front-rear direction at the location of the recess 40.

Inflators 42

As illustrated in FIG. 1, the pair of left and right inflators 42 are built into a front end portion of the airbag 34 (specifically, the passenger seat airbag 36), and are disposed in a row along the vehicle width direction. Specifically, in plan view the pair of inflators 42 are disposed at symmetrical positions to the left and right of the vehicle width direction center line CL of the vehicle airbag device 30, and are disposed to the front side of the display 28. The inflators 42 are made of metal, and are each formed in a hollow, substantially circular column shape with axial direction in the up-down direction. Attachment flanges, not illustrated in the drawings, are provided to outer peripheral portions of the respective inflators 42 at an up-down direction intermediate portion. As illustrated in FIG. 3, the inflators 42 are inserted into attachment holes (not illustrated in the drawings) formed in a bottom wall 32A of the module case 32, and the attachment flanges are fixed to the bottom wall 32A by fastening members (not illustrated in the drawings) such as bolts. Upper portions of the inflators 42 accordingly project out to the upper side of the bottom wall 32A of the module case 32, and lower portions of the pair of inflators 42 project out to the lower side of the module case 32.

As illustrated in FIG. 1, the inflators 42 are electrically connected to an airbag ECU 50 (controller). When the inflators 42 are actuated by the airbag ECU 50, gas ejected from the upper portions of the inflators 42 is supplied to the airbag 34, inflating and deploying the airbag 34. The airbag 34 splits open the airbag door (instrument panel 18) accompanying inflation and deployment of the airbag 34, and the airbag 34 inflates and deploys to the outside (front side) of the instrument panel 18. Explanation follows regarding the airbag ECU 50.

The airbag ECU 50 is electrically connected to a collision sensor (or a set of sensors) 52, and is electrically connected to the pair of inflators 42 described above. Based on data from the collision sensor 52, the airbag ECU 50 is capable of detecting or predicting (the occurrence or inevitability of) various frontal collisions to the vehicle V to which it is installed, without distinguishing between different frontal collisions (or, for respective collision modes). The pair of inflators 42 are actuated at the same time as each other when the airbag ECU 50 detects or predicts a frontal collision based on the data from the collision sensor 52. Note that frontal collision modes in which the airbag ECU 50 actuates the pair of inflators 42 include frontal collisions at positions offset to one side in the vehicle width direction, such as oblique collisions and small overlap collisions.

Note that an oblique collision (oblique Moving Deformable Barrier (MDB) collision, oblique collision) takes place, for example, in an oblique front direction as defined by National Highway Traffic Safety Administration (NHTSA) (for example, a collision at a relative angle of 15° with respect to the collision counterpart, with a vehicle width direction overlap amount of approximately 35%). In the present exemplary embodiment, as an example, an oblique collision at a relative speed of 90 km/hr is envisaged. A small overlap collision is a frontal collision of the vehicle V in which, for example, the vehicle width direction overlap amount with the collision counterpart is 25% or less, as defined by Insurance Institute for Highway Safety (IIHS). For example, a collision on the vehicle width direction outside of a front side member, this being a vehicle body frame, corresponds to a small overlap collision. In the present exemplary embodiment, as an example, a small overlap collision at a relative speed of 64 km/hr is envisaged.

The vehicle V is also provided with a driving seat airbag device 60. The driving seat airbag device 60 is provided inside a rear end portion of the steering column 24, at the center of the steering wheel 22. The driving seat airbag device 60 includes a driving seat airbag 62, and an inflator (gas generation device), not illustrated in the drawings, that ejects and supplies gas to the driving seat airbag 62. The inflator of the driving seat airbag device 60 is electrically connected to the airbag ECU 50, and the driving seat airbag 62 inflates and deploys at the driving seat 10D side of the steering wheel 22 when the inflator is actuated by the airbag ECU 50. The driving seat airbag 62 and the center airbag 38 of the airbag 34 are configured so as not to impinge on each other in the vehicle width direction when this occurs.

Explanation follows regarding operation and advantageous effects of the present exemplary embodiment.

When, based on a signal from the collision sensor 52, the airbag ECU 50 detects or predicts a frontal collision to the vehicle V, the airbag ECU 50 actuates the pair of inflators 42 and the inflator of the driving seat airbag device 60. The airbag 34 that is supplied with gas from the pair of inflators 42 accordingly inflates and deploys while splitting open the airbag door provided to the instrument panel 18. The passenger seat airbag 36 of the airbag 34 inflates and deploys at the front side of the passenger P, and the center airbag 38 of the airbag 34 inflates and deploys at the vehicle width direction center side of the passenger seat airbag 36. On actuation of the inflator of the driving seat airbag device 60, the driving seat airbag 62 inflates and deploys at the front side of the driver D.

Oblique collision or Small Overlap Collision on the Driving Seat Side

In the event of a frontal collision to the vehicle V that is an oblique collision or a small overlap collision on the driving seat 10D side (left side), then, as indicated by arrow A in FIG. 1, the passenger P moves toward the left side, this being the collision side, in the vehicle width direction of the vehicle body while moving toward the front. Namely, the passenger P moves obliquely toward the front left (see the passenger P illustrated by double-dotted intermittent lines in FIG. 1). Note that since the passenger P is wearing a three point seatbelt device, the forward movement mode of the passenger P tilts forward about the waist.

The passenger P moving obliquely toward the front left then impacts the passenger seat airbag 36 and the center airbag 38. When this occurs, the upper body of the passenger P is supported by the passenger seat airbag 36 and the center airbag 38, restricting movement of the passenger P. This thereby enables the passenger P moving obliquely toward the front left to be restrained by the passenger seat airbag 36 and the center airbag 38 in an oblique collision or a small overlap collision.

Oblique collision or Small Overlap Collision on the Passenger Seat Side

In the event of a frontal collision to the vehicle V that is an oblique collision or a small overlap collision on the passenger seat 10P side (right side), as indicated by arrow B in FIG. 1, the driver D moves toward the right side, this being the collision side, in the vehicle width direction of the vehicle body while moving toward the front. Namely, the driver D moves obliquely toward the front right. Similarly to as described above, since the driver D is wearing a three point seatbelt device, the forward movement mode of the driver D tilts forward about the waist.

The driver D moving obliquely toward the front right then impacts the driving seat airbag 62 and the center airbag 38. When this occurs, the upper body of the driver D is supported by the driving seat airbag 62 and the center airbag 38, restricting movement of the driver D. This thereby enables the driver D moving obliquely toward the front right to be restrained by the driving seat airbag 62 and the center airbag 38 in an oblique collision or a small overlap collision.

In the vehicle V, the display 28 is installed at the vehicle width direction central portion of the instrument panel 18, and the display 28 projects out from the center panel 20 toward the upper side. Accordingly, there could be concerns of inflation and deployment of the center airbag 38 being obstructed by the display 28 during inflation and deployment of the airbag 34.

The pocket shaped recess 40 opening toward the lower side is formed at the lower face of the front end portion 38F of the inflated and deployed center airbag 38, and the display 28 is covered from the upper side by the recess 40. Namely, the center airbag 38 (airbag 34) inflates and deploys such that the recess 40 of the center airbag 38 covers the display 28 from the upper side. Therefore, the display 28 may be suppressed or prevented from obstructing inflation and deployment of the center airbag 38 (airbag 34). This thereby enables the center airbag 38 to be disposed on the vehicle width direction center side, while suppressing any detriment to the inflation and deployment characteristics of the center airbag 38 (airbag 34), even with the display 28 installed at the vehicle width direction central portion of the instrument panel 18. Moreover, since the airbag 34 inflates and deploys such that the recess 40 of the center airbag 38 covers the display 28 from the upper side, the display 28 can be suppressed or prevented from breaking or flying off during inflation and deployment of the center airbag 38.

Following inflation and deployment of the center airbag 38, the center airbag 38 enfolds the display 28 in the front-rear direction at the location of the recess 40. The front end portion 38F of the center airbag 38 is accordingly supported with respect to load from the rear side by the display 28, the instrument panel 18, and the windshield WS. This thereby enables sufficient reaction force from the center airbag 38 to act on the passenger P or the driver D impacting the center airbag 38 during an oblique collision of the vehicle V. The passenger P or the driver D can accordingly be well restrained by the center airbag 38 in an oblique collision of the vehicle V in which the display 28 is installed at the vehicle width direction central portion of the instrument panel 18. Due to the above, restraint performance with respect to the passenger P or the driver D can be improved, while suppressing or preventing obstruction of inflation and deployment of the center airbag 38 disposed at the vehicle width direction center side by the display 28.

Modified Examples

Figure 4:
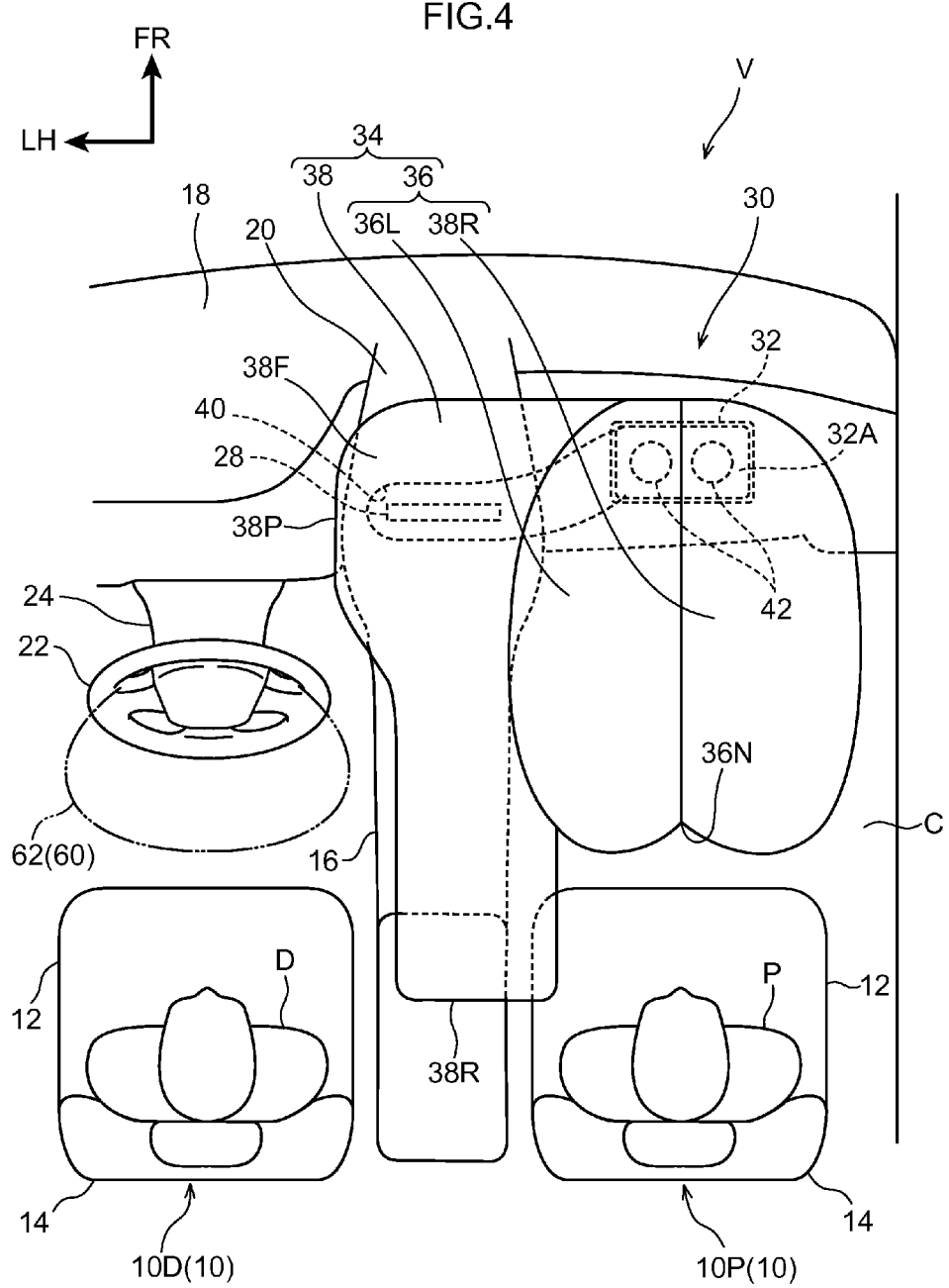
FIG. 4 is a plan view corresponding to FIG. 1, illustrating a modified example of a recess formed at a center airbag illustrated in FIG. 1.
Figure 5:
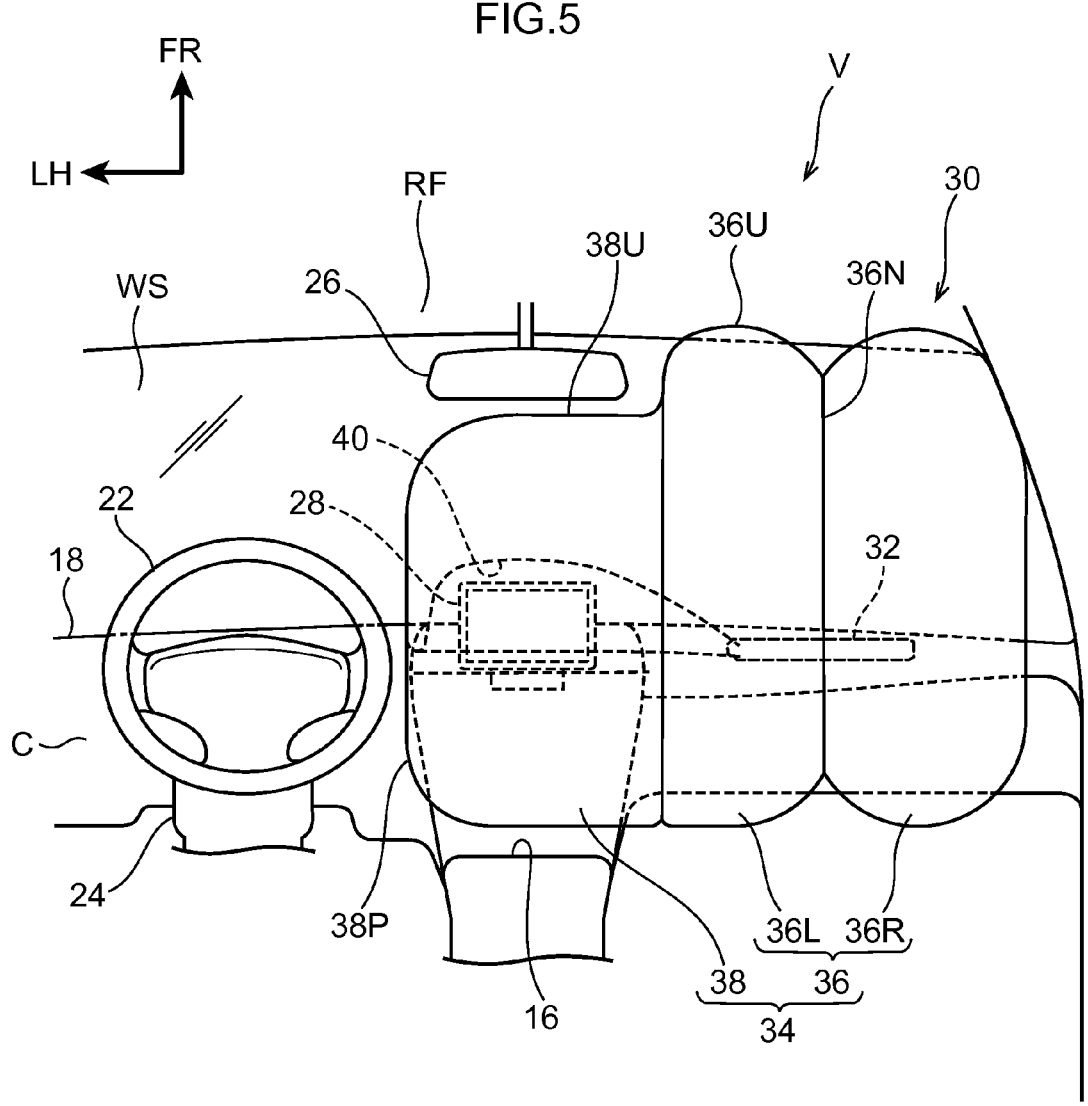
FIG. 5 is a back view corresponding to FIG. 2, illustrating the modified example of the recess illustrated in FIG. 4.

In the present exemplary embodiment, the recess 40 formed at the lower face of the center airbag 38 is formed in a substantially elliptical cone shape opening toward the lower side. However, the shape of the recess 40 is not limited thereto. For example, as illustrated in FIG. 4 and FIG. 5, the recess 40 may be extended toward the vehicle width direction outside, and a vehicle width direction outside portion of the recess 40 may be disposed in the vicinity of the airbag door in the instrument panel 18. Good coverage of the display 28 by the recess 40 from the upper side during inflation and deployment of the center airbag 38 is thereby enabled since the opening of the recess 40 is enlarged toward the vehicle width direction outside. This thereby enables improved inflation and deployment characteristics in the center airbag 38.

Note that in the present exemplary embodiment and the modified example described above, the pair of inflators 42 are configured so as to be actuated by the airbag ECU 50 at substantially the same time. However, the actuation timings of the pair of inflators 42 may be staggered in consideration of the inflation and deployment characteristics of the airbag 34. For example, the inflator 42 disposed on the vehicle width direction outside may be actuated after actuation of the inflator 42 disposed on the vehicle width direction central side.

In the present exemplary embodiment and the modified examples described above, the passenger seat airbag 36 and the center airbag 38 are formed in an integral bag shape in the airbag 34. Instead, the passenger seat airbag 36 and the center airbag 38 may, for example, be formed in separate bag shapes, and integrated by stitching the two together. In such cases, at least front end portions of the passenger seat airbag 36 and the center airbag 38 are in communication with each other.

What is claimed is:

1. A vehicle airbag device, comprising:
   an airbag that is disposed at an inner side of an instrument panel, that receives a supply of gas from an inflator and inflates and deploys to an outer side of the instrument panel, and that comprises a first bag that inflates and deploys at a vehicle front side of an occupant, and a second bag that inflates and deploys at a vehicle width direction center side of the first bag; and
   a recess that is formed at a lower face of the second bag when inflated and deployed, that is open toward a vehicle lower side, and that covers an interior component that projects from the instrument panel toward a vehicle upper side at a vehicle width direction central portion of the instrument panel.

2. The vehicle airbag device of claim 1, wherein the recess has a substantially elliptical cone shape open toward the lower side.

3. The vehicle airbag device of claim 1, wherein the recess extends toward a vehicle width direction outer side, and a vehicle width direction outer side portion of the recess is in the vicinity of an airbag door of the instrument panel.

4. The vehicle airbag device of claim 1, wherein a rear end portion of the second bag projects out to a vehicle rear side of the first bag in plan view when inflated and deployed.

5. The vehicle airbag device of claim 1, wherein an upper end of the second bag is lower than an upper end of the first bag when inflated and deployed.

6. The vehicle airbag device of claim 1, wherein the first bag is a passenger seat airbag, and the second bag is a center airbag that is adjacent to the first bag at a vehicle width direction center side and is configured to inflate along a vehicle front-rear direction.

7. The vehicle airbag device of claim 6, wherein the first bag comprises a left bag section and a right bag section, which are configured to form a substantially left-right symmetrical shape in plan view when inflated and deployed, and wherein the first bag and the second bag are configured such that, when inflated and deployed, a nook is formed between a rear end of the left bag section and a rear end of the right bag section.

8. The vehicle airbag device of claim 1, wherein the interior component is a display device.

9. The vehicle airbag device of claim 1, wherein an upper end of the second bag is set to a height that does not impinge on a rear-view mirror when inflated and deployed.

* * * * *